United States Patent Office 3,455,898
Patented July 15, 1969

3,455,898
WATER-INSOLUBLE MONOAZO DYES CONTAINING A 2,1-BENZOISOTHIAZOLYN-(3) RADICAL
Matthias Seefelder, Ludwigshafen (Rhine), Herbert Ambrust, Frankenthal, Pfalz, and Hans Guenter Wippel, Ludwigshafen (Rhine), Germany, assignors to Badische Anilin- & Soda-Fabrik Aktiengesellschaft, Ludwigshafen (Rhine), Germany
No Drawing. Filed June 3, 1966, Ser. No. 554,989
Claims priority, application Germany, June 10, 1965, B 82,343
Int. Cl. C09b 29/36
U.S. Cl. 260—158                      7 Claims

ABSTRACT OF THE DISCLOSURE

Disperse monoazo dyes of a 3-amino-benzisothiazole as the diazo component and N-substituted aniline as the coupling component, said dyes being useful for application to textile materials of cellulose acetate, polyesters and polyamides.

---

This invention relates to new water-insoluble monoazo dyes containing a 2,1-benzoisothiazolyl-(3) radical.

The new compounds are disperse dyes suitable for dyeing materials made of cellulose acetate, synthetic linear polyesters and polyamides.

In particular this invention relates to monoazo dyes of the general formula:

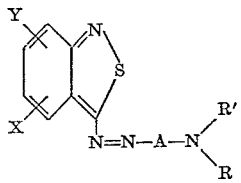

in which X and Y denote hydrogen, chlorine or bromine atoms of nitro, trifluoromethyl, alkoxy, carbalkoxy, acylamino or alkylsulfone groups, the last four each having one to four carbon atoms, A denotes a substituted or unsubstituted para-phenylene radical, R denotes a hydrogen atom or a substituted or unsubstituted alkyl radical having one to four carbon atoms, and R' denotes a substituted or unsubstituted alkyl radical.

Specific examples of radicals X and Y are: hydrogen, nitro, chloro, bromo, methyl, ethyl, methoxy, ethoxy, carbomethoxy, carboethoxy, trifluoromethyl, methylsulfonyl, ethylsulfonyl, acetylamino or propionylamino.

Especially interesting and valuable compounds are those having the general formula.

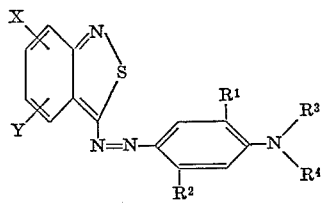

in which X denotes a hydrogen, chlorine or bromine atom or a nitro, alkoxy or alkylsulfone group, Y denotes a hydrogen, chlorine or bromine atom or a nitro, alkoxy or alkylsulfone group, $R^1$ denotes a hydrogen atom or an alkyl or alkoxy group each having one to four carbon atoms, $R^2$ denotes a hydrogen, chlorine or bromine atom or an alkyl, alkoxy or acylamino group each having one to four carbon atoms or a trifluoromethyl group, $R^3$ denotes a hydrogen atom or an alkyl, cholroalkyl, bromoalkyl, cyanoalkyl, hydroxyalkyl, alkoxyalkyl, acyloxyalkyl or carbalkoxyalkyl group, all alkyl, alkoxy, acyl or carbalkoxy groups having one to four carbon atoms, and $R^4$ denotes an alkyl, chloroalkyl, bromoalkyl, cyanoalkyl, hydroxyalkyl, alkoxyalkyl, acyloxyalkyl or carbalkoxyalkyl group, all alkyl, alkoxy, acyl or carbalkoxy groups having one to four carbon atoms.

The following radicals may be given as specific examples of $R^3$ and $R^4$: methyl, ethyl, propyl, butyl, β-cyanoethyl, β-hydroxyethyl, β,γ-dihydroxypropyl, β-hydroxy-γ-chloropropyl, carbomethoxyethyl, carboethoxyethyl, carbomethoxypropyl, acetoxyethyl, methoxypropyl, ethoxyethyl, ethoxypropyl, methoxyethly, β-chloroethyl and butane-3-one-1-yl.

Coupling components for the production of the new dyes are for example:

N-ethylaminobenzene,
N-butylaminobenzene,
N-cyanoethylaminobenzene,
N-methoxyethyl-3-methylbenzene,
N-cyanoethyl-3-chlorobenzene,
N,N-diethylaminobenzene,
N-ethyl-N-β-hydroxyethylaminobenzene,
N-ethyl-N-β-cyanoethylaminobenzene,
N-β-hydroxyethyl-N-β-cyanoethylaminobenzene,
N-ethyl-N-β-acetoxyethylaminobenzene,
N-ethyl-N-β-methoxyethylaminobenzene,
N-β-acetoxyethyl-N-β-cyanoethylaminobenzene,
N,N-di-(β-hydroxyethyl)-aminobenzene,
N-β-carbomethoxyethyl-N-β-hydroxyethylaminobenzene,
N-β-acetoxyethyl-N-β-hydroxyethylaminobenzene,
N-β-methoxyethyl-N-β-hydroxyethylaminobenzene,
N-β-methoxyethyl-N-β-cyanoethylaminobenzene,
N-β-methoxyethyl-N-β-carbomethoxyethylaminobenzene,
N-β-methoxyethyl-N-β-acetoxyethylaminobenzene,
N-β-methoxyethyl-N-(butane-3-one-1-yl)-aminobenzene,
N-ethyl-N-β-cyanoethyl-3-methylaminobenzene,
N-ethyl-N-β-hydroxyethyl-3-methylaminobenzene,
N-ethyl-N-γ-acetylaminopropyl-3-methylaminobenzene,
N,N-di-(β-hydroxyethyl)-3-methylaminobenzene,
N-β-cyanoethyl-N-β-hydroxyethyl-3-methylaminobenzene,
N-β-cyanoethyl-N-β-methoxyethyl-3-methylaminobenzene,
N-β-cyanoethyl-N-butyl-3-methylaminobenzene,
N-β-hydroxyethyl-N-butyl-3-methylaminobenzene,
N-β-chloroethyl-N-butyl-3-methylaminobenzene,
N-β-chloroethyl-N-β-methoxyethyl-3-methylaminobenzene,
N,N-di-(β-hydroxyethyl)-3-chloroaminobenzene,
N-β-hydroxyethyl-N-β-cyanoethyl-3-chloroaminobenzene,
N,N-di-(β-hydroxyethyl)-3-acetylaminoaminobenzene,
N-β-hydroxyethyl-N-β-cyanoethyl-3-acetylaminoaminobenzene,
N,N-di-(β-hydroxyethyl)-2-methoxy-5-acetylaminoaminobenzene, and
N-β-hydroxyethyl-N-β-cyanoethyl-2-methoxy-5-acetylaminoaminobenzene.

The diazo components for the production of the new dyes are obtainable by methods described in the literature. They are obtained particularly simply by reaction of ortho-aminobenzonitriles with hydrogen sulfide followed by oxidation for example by the method described in Belgian patent specification No. 670,652.

The dyes obtainable according to the invention are eminently suitable, particularly in finely divided form, for dyeing materials such as fibers, filaments, threads, flock, woven fabrics and knitted fabrics of cellulose acetate (secondary acetate and triacetate), linear polyesters and polyamides.

The dyeings obtained are distinguished by good fastness and good affinity. Wet fastness and fastness to light, gas fume fading and heat, which in many cases are excellent, should be particularly emphasized.

The parts and percentages specified in the following examples, which will further illustrate the invention, are by weight; parts by volume bear the same relation to parts by weight as the liter (STP) to the kilogram.

Example 1

3.75 parts of 3-amino-2,1-benzoisothiazole is dissolved at 25° C. in 14 parts of concentrated sulfuric acid. Then at 0° to 5° C., first 3 parts of a mixture of glacial acetic acid and propionic acid (17:3) is allowed to drip in and diazotization is carried out at this temperature by gradual addition of 7.25 parts of nitrosylsulfuric acid (having a content of 13.1% of free dinitrogen trioxide). The whole is stirred for one hour and then 0.4 part of urea is added. The clear diazo solution thus obtained is allowed to flow gradually into a solution consisting of 4.2 parts of N-β-hydroxyethyl-N-ethyl-aminobenzene, 300 parts of water, 3 parts of concentrated hydrochloric acid, 60 parts of sodium acetate, and 100 parts of ice. The dye, precipitated in crystalline form, is stirred for one hour, suction filtered, washed with water until neutral and dried at 50° C. at subatmospheric pressure.

The dye thus obtained dyes cellulose acetate ruby red shades having very good fastness to light. The dye goes on to polyethylene glycol terephthalate and polyamide in full ruby red shades.

If the components set out in the following table be used instead of the coupling component specified in Example 1, dyes having the same good properties are obtained.

| Example No. | Coupling component | Shade of dyeing on — Acetate | Polyamide | Polyester |
|---|---|---|---|---|
| 2 | C₆H₅–N(C₂H₅)(C₂H₄CN) | Ruby | Red brown | Red. |
| 3 | C₆H₅–N(C₂H₅)(C₂H₄OC(O)CH₃) | do | Claret | Ruby. |
| 4 | C₆H₅–N(C₂H₄OH)(C₂H₄OH) | do | Red violet | Do. |
| 5 | C₆H₅–N(C₂H₄OH)(C₂H₄CN) | Red | Red brown | Red. |
| 6 | C₆H₅–N(C₂H₄OH)(C₂H₄CO₂CH₃) | Red | Brown red | Red. |
| 7 | C₆H₅–N(C₂H₄OH)(C₂H₄OCH₃) | Ruby | Claret | Ruby. |
| 8 | C₆H₅–N(C₂H₄OH)(C₂H₄OC(O)CH₃) | do | do | Do. |
| 9 | C₆H₅–N(C₂H₄CN)(C₂H₄OCH₃) | do | Red brown | Red. |
| 10 | C₆H₅–N(C₂H₄CN)(C₂H₄OC(O)CH₃) | do | do | Red. |
| 11 | C₆H₅–N(C₂H₄OCH₃)(C₂H₄CO₂CH₃) | Red | Brown red | Red. |
| 12 | C₆H₅–N(C₂H₄OCH₃)(C₂H₄OC(O)CH₃) | Red | do | Red. |
| 13 | C₆H₅–N(C₂H₄OCH₃)(C₂H₄COCH₃) | Ruby | Red brown | Red. |

| Example No. | Coupling component | Shade of dyeing on— Acetate | Shade of dyeing on— Polyamide | Shade of dyeing on— Polyester |
|---|---|---|---|---|
| 14 | 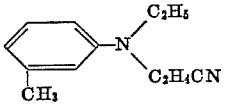 3-methyl-N-ethyl-N-(β-cyanoethyl)aniline | Blue red | Red violet | Blue red. |
| 15 | 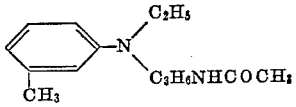 3-methyl-N-ethyl-N-(γ-acetylaminopropyl)aniline | Violet | Violet | Violet. |
| 16 | 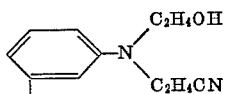 3-methyl-N-(β-hydroxyethyl)-N-(β-cyanoethyl)aniline | Ruby | Red brown | Ruby. |
| 17 | 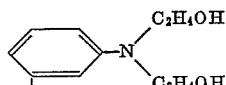 3-methyl-N,N-bis(β-hydroxyethyl)aniline | Violet | Blue violet | Violet. |
| 18 | 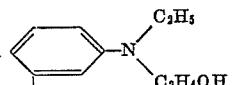 3-methyl-N-ethyl-N-(β-hydroxyethyl)aniline | Blue violet | do | Blue violet. |
| 19 | 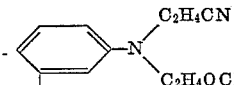 3-methyl-N-(β-cyanoethyl)-N-(β-methoxyethyl)aniline | Ruby | Red brown | Ruby. |
| 20 | 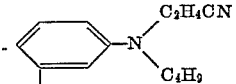 3-methyl-N-(β-cyanoethyl)-N-butylaniline | Blue red | Red violet | Blue red. |
| 21 | 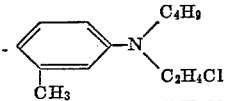 3-methyl-N-butyl-N-(β-chloroethyl)aniline | do | do | Do. |
| 22 | 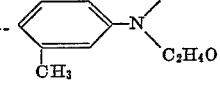 3-methyl-N-(β-chloroethyl)-N-(β-methoxyethyl)aniline | Ruby | Red brown | Ruby. |
| 23 | 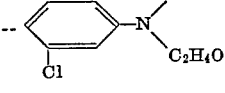 3-chloro-N,N-bis(β-hydroxyethyl)aniline | Red violet | Red violet | Do. |
| 24 | 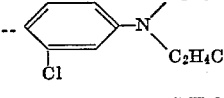 3-chloro-N-(β-hydroxyethyl)-N-(β-cyanoethyl)aniline | Blue red | Red brown | Red brown. |
| 25 | 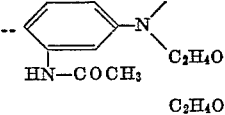 | Violet | Violet blue | Violet. |
| 26 | 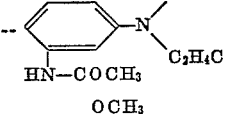 | Red violet | Currant | Do. |
| 27 | 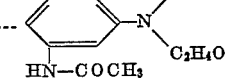 | Navy blue | Blue | Blue. |
| 28 | 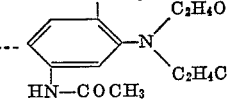 | Blue violet | Violet blue | Navy blue. |

Example 29

4.88 parts of 3-amino-5-nitro-2,1-benzoisothiazole is dissolved at 10° to 15° C. in 60 parts of concentrated sulfuric acid. Into this solution at 0° to 5° C., first 25 parts of a mixture of glacial acetic acid and propionic acid (17:3) and then 7.45 parts of nitrosylsulfuric acid (having a content of 12.8% of free dinitrogen trioxide) is dripped. The resultant clear diazo solution is stirred for three hours at 0° to 5° C. and then allowed to flow into a solution of 4.9 parts of N,N-di-(β-hydroxyethyl)-3-methylaminobenzene, 500 parts of water, 3 parts of concentrated hydrochloric acid and 250 parts of ice. The dye, which is deposited in crystalline form, is suction filtered, washed with water until neutral and dried at 50° C. at subatmospheric pressure.

The dye thus obtained dyes polyethylene glycol terephthalate navy blue shades having very good wet and heat fastness. It dyes cellulose acetate blue shades and polyamide gray blue shades.

When the components set out in the following table are used instead of the coupling component given in Example 29 dyes having similar properties are obtained:

| Example No. | Coupling component | Shade of dyeing on— | | |
|---|---|---|---|---|
| | | Acetate | Polyamide | Polyester |
| 30 | 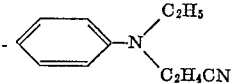 | Violet | Gray blue | Violet. |
| 31 | 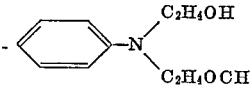 | Blue violet | Blue violet | Blue violet. |
| 32 | 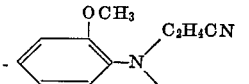 | Turquoise | Green | Blue green. |
| 33 | 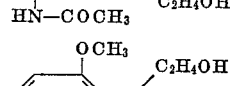 | Green blue | do | Green. |
| 34 | 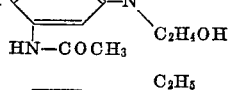 | Blue | Blue | Blue. |
| 35 | 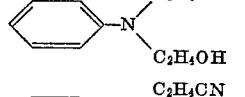 | Red blue | do | Do. |
| 36 | 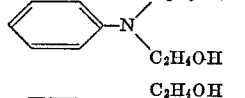 | Blue | Blue violet | Navy blue. |
| 37 | 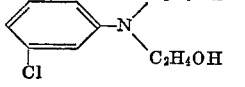 | do | Blue | Blue. |
| 38 | 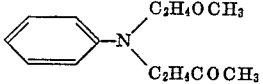 | Violet | Violet | Violet. |
| 39 | 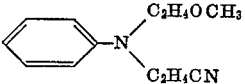 | Green blue | Turquoise | Turquoise. |
| 40 | 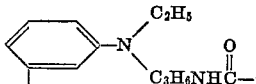 | Blue | Blue | Blue. |
| 41 | 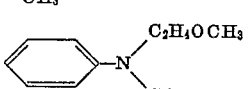 | Red blue | do | Do. |
| 42 | 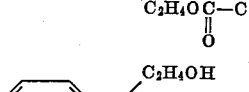 | Blue | do | Do. |

Example 43

By using 7.7 parts of 3-amino-2,1-benzoisothiazole and 4.9 parts of N,N-di-(β-hydroxyethyl)-3-methylaminobenzene (instead of the 3.75 parts of 3-amino-2,1-benzoisothiazole and 4.2 parts of N-β-hydroxyethyl-N-ethylaminobenzene specified in Example 1) and following the procedure of the first paragraph of Example 1, a dye is obtained which dyes polyamide bright blue shades having very good fastness to washing, perspiration and heat setting.

Dyes having similar properties are obtained by using the coupling components specified in the above tables instead of N,N-di-(β-hydroxyethyl)-3-methylaminobenzene.

We claim:
1. A disperse monoazo dye of the formula:

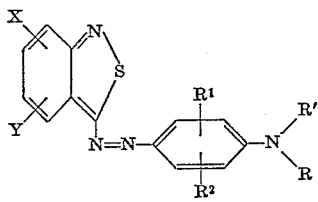

wherein:
X and Y each denote a substituent selected from the class consisting of hydrogen, chlorine, bromine, nitro, trifluoromethyl, alkoxy of 1 to 4 carbon atoms, carbalkoxy of 1 to 4 carbon atoms, alkanoylamino of 1 to 4 carbon atoms and alkylsulfone of 1 to 4 carbon atoms;
R¹ denotes a substituent selected from the class consisting of hydrogen, alkyl of 1 to 4 carbon atoms and alkoxy of 1 to 4 carbon atoms;
R² denotes a substituent selected from the class consisting of hydrogen, bromine, chlorine, alkyl of 1 to 4 carbon atoms, alkoxy of 1 to 4 carbon atoms and alkanoylamino of 1 to 4 carbon atoms;
R' denotes a substituent selected from the class consisting of hydrogen, alkyl, chloroalkyl, bromoalkyl, cyanoalkyl, hydroxyalkyl, alkoxyalkyl, alkanoyloxyalkyl and carbalkoxyalkyl, each of the alkyl, alkoxy, alkanoyl and carbalkoxy radicals having 1 to 4 carbon atoms; and
R denotes a substituent selected from the class consisting of alkyl, chloroalkyl, bromoalkyl, cyanoalkyl, hydroxyalkyl, alkoxyalkyl, alkanoyloxyalkyl and carbalkoxyalkyl, each of the alkyl, alkoxy, alkanoyl and carbalkoxy radicals having 1 to 4 carbon atoms.

2. A disperse monoazo dye of the formula:

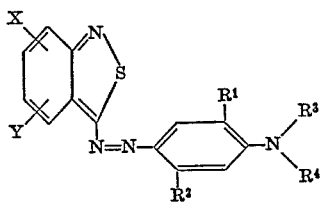

wherein:
X denotes a substituent selected from the class consisting of hydrogen, chlorine and bromine;
Y denotes a substituent selected from the class consisting of hydrogen and nitro;
R¹ denotes a substituent selected from the class consisting of hydrogen, alkyl of 1 to 4 carbon atoms and alkoxy of 1 to 4 carbon atoms;
R² denotes a substituent selected from the class consisting of hydrogen, bromine, chlorine, alkyl of 1 to 4 carbon atoms, alkoxy of 1 to 4 carbon atoms and alkanoylamino of 1 to 4 carbon atoms;
R³ denotes a substituent selected from the class consisting of hydrogen, alkyl, chloroalkyl, bromoalkyl, cyanoalkyl, hydroxyalkyl, alkoxyalkyl, alkanoyloxyalkyl and carbalkoxyalkyl, each of the alkyl, alkoxy, alkanoyl and carbalkoxy radicals having 1 to 4 carbon atoms; and
R⁴ denotes a substituent selected from the class consisting of alkyl, chloroalkyl, bromoalkyl, cyanoalkyl, hydroxyalkyl, alkoxyalkyl, alkanoyloxyalkyl and carbalkoxyalkyl, each of the alkyl, alkoxy, alkanoyl and carbalkoxy radicals having 1 to 4 carbon atoms.

3. The compound having the formula:

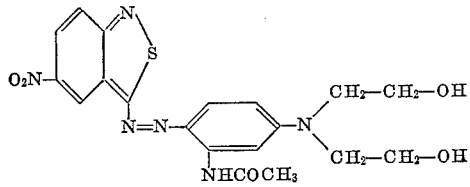

4. The compound having the formula:

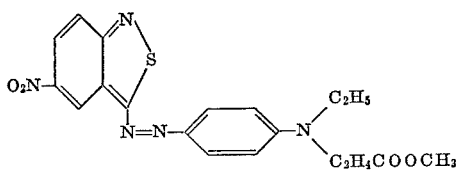

5. The compound having the formula:

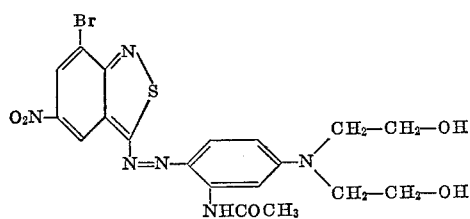

6. The compound having the formula:

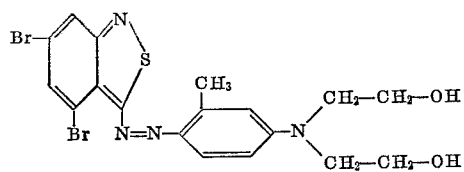

7. The compound having the formula:

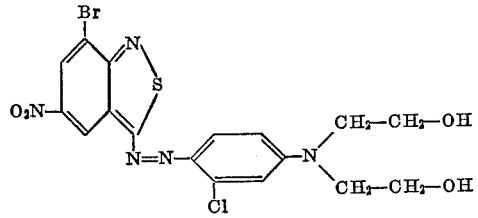

References Cited
UNITED STATES PATENTS

| | | | |
|---|---|---|---|
| 2,149,051 | 2/1939 | Heinrich et al. | 260—158 XR |
| 2,349,899 | 5/1944 | Back | 260—158 XR |
| 2,373,700 | 4/1945 | McNally et al. | 260—158 XR |
| 2,785,157 | 3/1957 | Straley et al. | 260—158 |
| 2,889,315 | 6/1959 | Bossard et al. | 260—158 XR |
| 2,891,942 | 6/1959 | Merian | 260—158 XR |
| 3,057,848 | 10/1962 | Dehn et al. | 260—158 |

FLOYD D. HIGEL, Primary Examiner

U.S. Cl. X.R.

8—41, 50; 260—304, 465, 471, 490, 562, 573, 574